US008953056B2

(12) United States Patent
Ovsiannikov

(10) Patent No.: US 8,953,056 B2
(45) Date of Patent: Feb. 10, 2015

(54) METHOD, APPARATUS AND SYSTEM FOR DYNAMIC RANGE ESTIMATION OF IMAGED SCENES

(75) Inventor: Ilia Ovsiannikov, Studio City, CA (US)

(73) Assignee: Micron Technology, Inc., Boise, ID (US)

(*) Notice: Subject to any disclaimer, the term of this patent is extended or adjusted under 35 U.S.C. 154(b) by 266 days.

(21) Appl. No.: 12/874,811

(22) Filed: Sep. 2, 2010

(65) Prior Publication Data
US 2010/0328491 A1 Dec. 30, 2010

Related U.S. Application Data

(62) Division of application No. 11/512,302, filed on Aug. 30, 2006, now Pat. No. 7,944,485.

(51) Int. Cl.
H04N 5/235 (2006.01)
G03B 7/08 (2014.01)

(52) U.S. Cl.
CPC .................... G03B 7/08 (2013.01)
USPC .............. 348/221.1; 348/229.1; 348/362; 348/363; 348/364

(58) Field of Classification Search
USPC ............... 348/221.1, 229.1, 362–364
See application file for complete search history.

(56) References Cited

U.S. PATENT DOCUMENTS

| 5,309,243 | A | * | 5/1994 | Tsai | 348/221.1 |
| 5,638,119 | A | | 6/1997 | Cornuejols | |
| 6,140,630 | A | | 10/2000 | Rhodes | |
| 6,204,524 | B1 | | 3/2001 | Rhodes | |
| 6,310,366 | B1 | | 10/2001 | Rhodes et al. | |
| 6,326,652 | B1 | | 12/2001 | Rhodes | |
| 6,333,205 | B1 | | 12/2001 | Rhodes | |
| 6,376,868 | B1 | | 4/2002 | Rhodes | |
| 8,125,551 | B2 | * | 2/2012 | Nakamura et al. | 348/294 |
| 2003/0098919 | A1 | * | 5/2003 | Liu et al. | 348/297 |
| 2003/0184659 | A1 | * | 10/2003 | Skow | 348/223.1 |
| 2003/0184671 | A1 | * | 10/2003 | Robins et al. | 348/362 |
| 2004/0085475 | A1 | | 5/2004 | Skow et al. | |
| 2005/0013501 | A1 | | 1/2005 | Kang et al. | |
| 2005/0226526 | A1 | | 10/2005 | Mitsunaga | |
| 2005/0275737 | A1 | * | 12/2005 | Cheng | 348/333.02 |
| 2006/0017597 | A1 | | 1/2006 | Jaspers | |
| 2007/0291152 | A1 | * | 12/2007 | Suekane et al. | 348/333.02 |

FOREIGN PATENT DOCUMENTS

JP 01046883 A 2/1989

* cited by examiner

Primary Examiner — Anthony J Daniels
(74) Attorney, Agent, or Firm — Dickstein Shapiro LLP

(57) ABSTRACT

A method, apparatus, and system for dynamic range estimation of imaged scenes for automatic exposure control. For a given exposure time setting, certain areas of a scene may be brighter than what a camera can capture. In cameras, including those experiencing substantial lens vignetting, a gain stage may be used to extend dynamic range and extract auto-exposure data from the extended dynamic range. Alternatively, dynamic range can be extended using pre-capture image information taken under reduced exposure conditions.

18 Claims, 7 Drawing Sheets

METHOD, APPARATUS AND SYSTEM FOR DYNAMIC RANGE ESTIMATION OF IMAGED SCENES

CROSS-REFERENCE TO RELATED APPLICATIONS

This application is a divisional of U.S. patent application Ser. No. 11/512,302, filed on Aug. 30, 2006 now U.S. Pat. No. 7,944,485, which is incorporated by reference in its entirety herein.

FIELD OF THE INVENTION

Disclosed embodiments relate generally to an image processing method, apparatus, and system for dynamic range estimation of imaged scenes.

BACKGROUND OF THE INVENTION

Ideally, digital images created through the use of CMOS and other solid state image sensors are exact duplications of the imaged scene projected upon the image sensor arrays. However, pixel saturation, analog-to-digital saturation, exposure, gain settings and bit width processing limitations in an imaging device can limit the dynamic range of a digital image.

To achieve a more realistic photographic image, an automatic camera must choose an appropriate exposure time and gain setting for image pixel signals using available dynamic range information. Generally, using higher gains and longer exposures result in the brightest areas of a scene being clipped. On the other hand, using lower gains and shorter exposures result in darker, noisier pictures. Therefore, to choose an optimal exposure while preventing clipping of the brightest areas, the camera's auto-exposure module relies on having scene luminance distribution and maximum scene luminance information available, which are affected by limitations on the dynamic range of the camera.

FIG. 1 is an image which shows a dynamic limitation based on pixel saturation. It includes a person in the foreground and a background containing a bright lamp. Both the person and the bright lamp are imaged without loss of detail, however the person looks underexposed. Merely increasing the exposure period may more correctly expose the person but would lead to brightness clipping and loss of detail of the lamp, as shown in FIG. 2. Clipping also occurs when a pixel output signal is limited in some way by the full range of an amplifier, analog-to-digital converter or other circuit within an imaging device that captures or processes the pixel signals of an image. When clipping occurs, pixel signals are flattened at the peak luminance values. As another example of pixel signal clipping due to circuit limitations, a sensor equipped with a 10-bit ADC would typically have an image processing pipeline with pixel values in the range 0 to 1023 Least Significant Bits (LSB). Thus, luminance that corresponds to a pixel value above 1023 LSB is clipped to 1023 LSB, resulting in a loss of information. Accordingly, there is a highest scene luminance $D_{Scene\ HI}$ and a highest luminance $D_{Cam\ HI}$ which can be sensed and processed by the camera without clipping.

Particularly, in scenes where an exposure setting may properly expose most of the scene while clipping some areas of the scene, as shown in FIG. 2, there is a need for the auto-exposure operation to have scene luminance information that exceeds $D_{Cam\ HI}$. If a decrease in exposure setting largely prevents the brightest areas of a scene from clipping without substantially underexposing the main subject, the auto-exposure operation should proceed further using the reduced exposure setting. However, if a decrease in exposure setting is insufficient to prevent the brightest areas of a scene from clipping without substantially underexposing the main subject, the auto-exposure operation should keep the exposure setting unchanged.

Additionally, when scene illumination changes rapidly, the rapid increase in scene luminance may exceed $D_{Cam\ HI}$ and saturate the image output, thereby resulting in a loss of information on scene brightness to the auto-exposure module. For example, a person may use her camera phone, place it on a table, later pick it up and attempt to take a picture immediately thereafter. While the camera phone is lying on the table, the camera lens faces the table surface and the luminance of the table is very low so that the auto-exposure module sets a long exposure time. As the person picks the phone up and points the camera at a scene to be captured, e.g., a bright outdoor scene viewed through a window, the scene luminance changes by many orders of magnitude within seconds. The excessive illumination causes the image to saturate and become clipped. Consequently, the auto-exposure module has insufficient information on the actual brightness of the scene and cannot accurately determine the appropriate exposure for the image. There is therefore a need to capture as much luminance information as possible from a pre-capture image for use in auto-exposure operations so these operations may be more quickly performed to set a proper exposure for image capture.

DETAILED DESCRIPTION OF THE INVENTION

Disclosed embodiments relate to a method, apparatus and system for dynamic range estimation of imaged scenes and use of the estimated dynamic range in auto-exposure operations. Embodiments discussed herein enable a camera to sense and process luminance information beyond $D_{Cam\ HI}$, the highest luminance value available in an image processing pipeline. Typically, luminance information exceeding $D_{Cam\ Hi}$ may be present in the pixel signals, but is lost during gain operations, for example, during lens vignetting correction and white point correction. However, gain stages in the image processing pipeline are modified to process pixel luminance values having a dynamic range beyond the $D_{Cam\ HI}$, luminance value which can be processed by the image processing pipeline. Luminance values with increased dynamic range are provided to a camera auto-exposure module which enables a quicker reaction to changes in luminance values.

Some embodiments described herein cause the intentional underexposure of a scene during a pre-image capture operation to ensure that pixel brightness values are not clipped in the pixel signal capture or processing. These embodiments obtain an estimate for a dynamic range, and coupled with additional gaining of pixel signals, restore the signals in a processing pipeline to represent an imaged scene.

The term "pixel," as used herein, refers to a photo-element unit cell containing a photosensor device and associated structures for converting photons to an electrical signal. For purposes of illustration, a representative three-color R, G, B pixel array is described herein; however, the invention is not limited to the use of an R, G, B array, and can be used with other color arrays, one example being C, M, Y, G (which represents cyan, magenta, yellow and green color filters). In addition, the invention can also be used in a mono-chromatic array where just one color is sensed by the array. Accordingly, the following detailed description of representative embodiments is not to be taken in a limiting sense.

It should also be understood that, taken alone, an image pixel does not distinguish one incoming color of light from another and its output signal represents only the intensity of light received, not any identification of color. For purposes of this disclosure, however, pixels of a pixel array will be referred to by color (i.e., "red pixel," "blue pixel," etc.) when a color filter is used in connection with the pixel to pass through a particular wavelength of light, corresponding to a particular color, onto the pixel. For a processed image, each pixel contains components of all three colors, i.e., red (R), blue (B), green (G) which are obtained through a demosaicing process of pixel signals from a pixel array as is known in the art.

Figure 2:
FIG. 2 is an image of the person of FIG. 1 showing the clipping of highlights of the bright lamp of FIG. 1.
Figure 1:
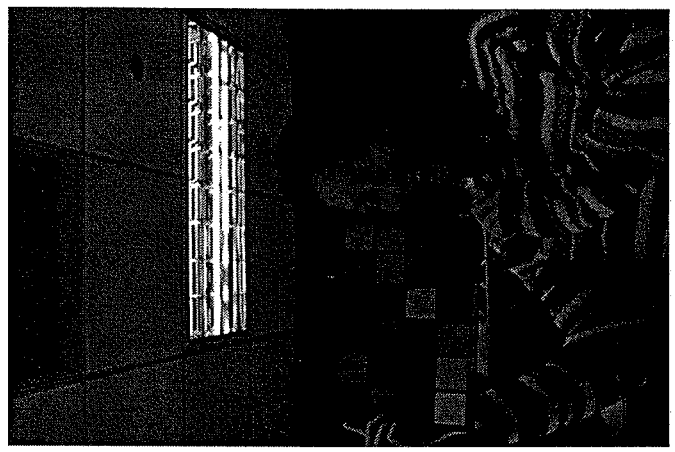
FIG. 1 is an original image of a person in the foreground and a background containing a bright lamp exhibiting underexposure of the person.
Figure 3:
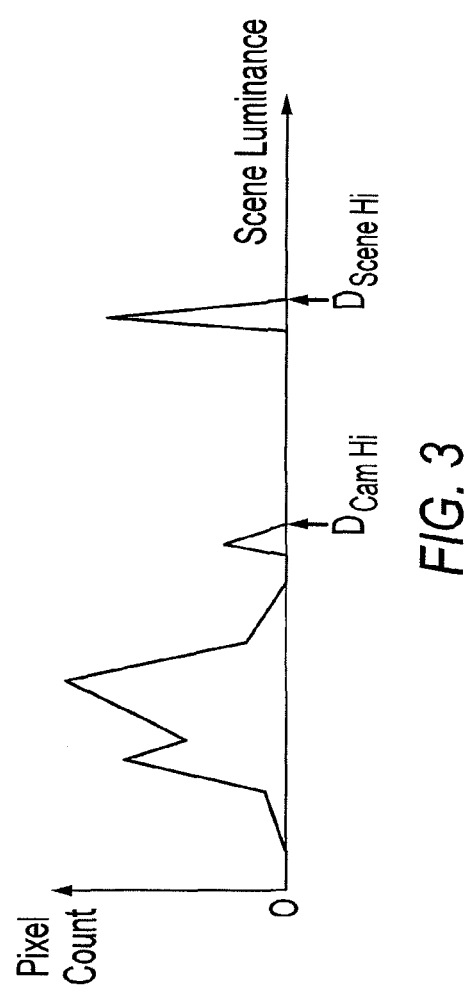
FIG. 3 is a histogram illustrating a scene wherein the highest scene luminance $D_{Scene\ Hi}$ exceeds the highest luminance $D_{Cam\ Hi}$ that can be sensed by a camera without clipping.

A histogram, such as shown in FIG. 3, results when a histogram module scans through each of the brightness values of an image and counts how many pixels have values that are at a brightness level from, for example, 0 through 255. FIG. 3 indicates that the imaged scene contains many mid-key tones, very few low-key tones (shadows) and significant high-key tones (highlights). FIG. 3 also indicates that a highest scene luminance $D_{Scene\_HI}$ exceeds a highest luminance $D_{Cam\_HI}$ which can be sensed and processed by the camera without clipping. In instances as shown in FIG. 3, the scene luminance above $D_{CamHI}$ is clipped, resulting in a loss of information.

As mentioned earlier, automatic exposure control requires as much non-clipped luminance information as possible; however, most pixel arrays and image processing circuits have a limited dynamic range due to signal clipping. The embodiments now described provide non-clipped luminance information to a camera auto-exposure module.

Figure 4B:
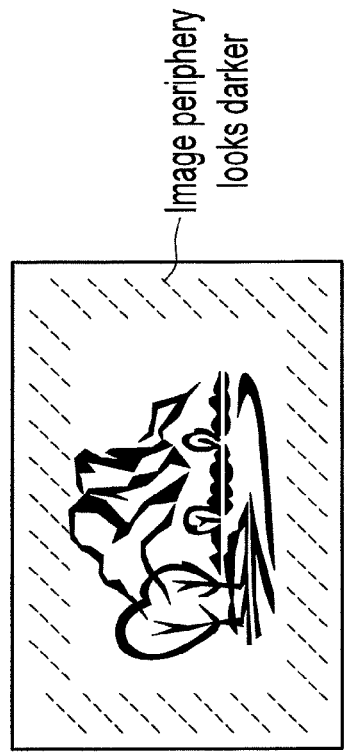
FIG. 4B is an image illustrating a lens vignetting effect on an image periphery.
Figure 4A:
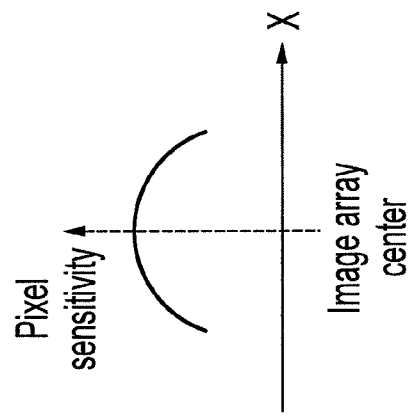
FIG. 4A is a line graph illustrating a lens vignetting effect in cameras.

A first embodiment makes use of pixel signal gains used to offset the effects of lens vignetting in cameras to increase the dynamic range of a camera. Particularly, lens vignetting in a camera decreases pixel response close to an image periphery. Because lens vignetting affects image periphery, the effects of an increase in the dynamic range of a camera is pronounced on the image periphery. Such a limitation is often acceptable as the image periphery frequently contains bright image backgrounds, for example, ceiling lights in an indoor scene or the sky in an outdoor scene. FIG. 4A illustrates a graph showing decreasing pixel signal output for pixels that are located away from a center of a pixel array. The same effect is shown in FIG. 4B in which pixel signals at the periphery of a pixel array appear darker than at the center of the pixel array.

Figure 5:
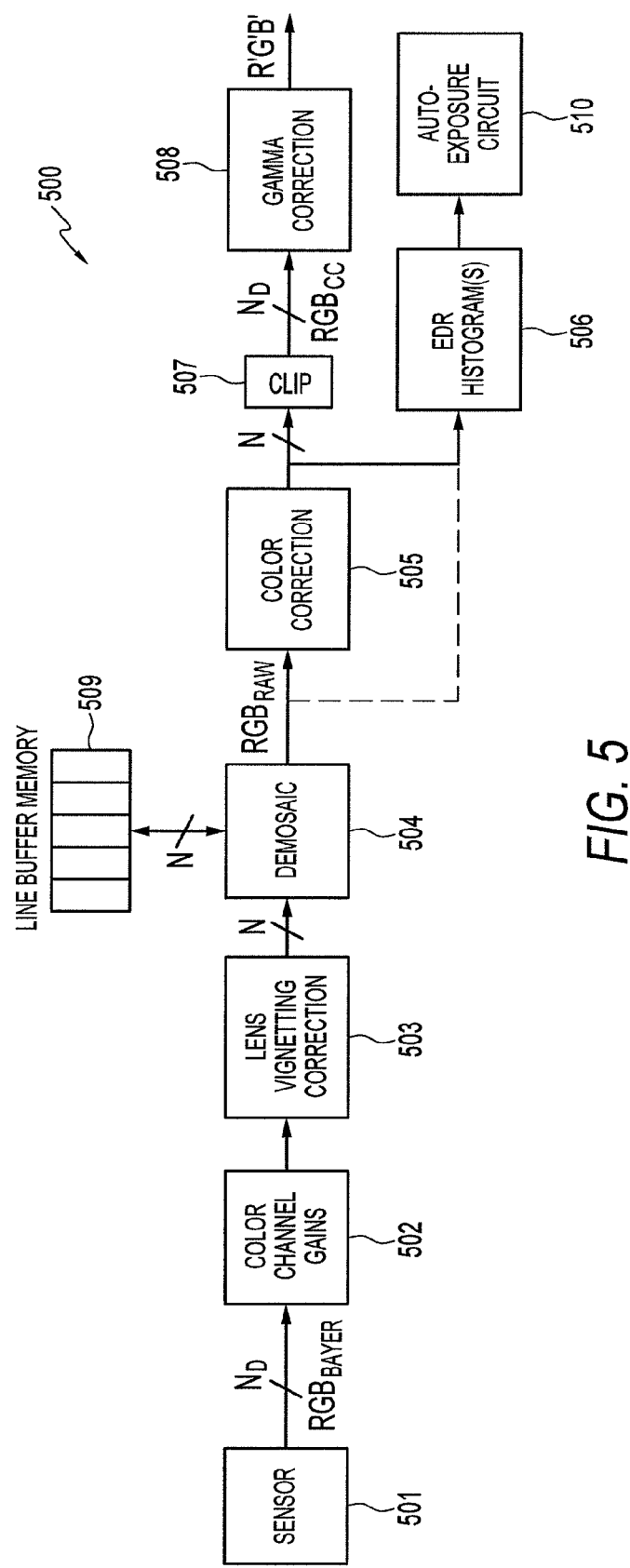
FIG. 5 is a block diagram of a first embodiment described herein.

FIG. 5 shows an image processing pipeline 500 in accordance with a first embodiment described herein. In FIG. 5, the output from an image sensor 501 may be digital pixel signals for a Bayer pattern pixel array, or any other sensor pixel array of bit width $N_D$. This bit width is determined by an analog-to-digital converter (ADC) that digitizes the pixel signals R, G, B from the pixel array. The output of the sensor 501 is connected to a color channel gain module 502 for white-point correction. The image sensor 501 includes a pixel array (not shown) having output lines connected to readout circuitry (not shown). The readout circuitry reads out digitized pixel signals from the array. Image sensors are described in e.g., U.S. Pat. Nos. 6,140,630; 6,376,868; 6,310,366; 6,326,652; 6,204,524 and 6,333,205, which are hereby incorporated by reference.

White-point correction is used to balance the white point of an image in accordance with the spectrum of the illuminant used to light the scene. The white point correction reduces color casts caused by changes in scene illuminant type from one scene to another.

After white point correction, a captured image is subject to lens vignetting correction in a lens vignetting module 503. Lens vignetting correction is done to account for the difference in illumination across the pixel array, i.e., lens vignetting correction compensates the luminance fall-off which may occur near the edges of a pixel array due to the lenses used to capture the image, as described above with reference to FIGS. 4A and 4B. Typically, pixel responses that have had a gain applied to them, for example, up to 4 times the original response, using lens vignetting correction and/or white point correction, would produce pixel signals which, for bright pixels, could be clipped to the bit width $N_D$ of the processing pipeline. However, in this embodiment, there is no clipping of the gained signal. Thus, the lens vignetting correction module 503 has a bit width N, wherein:

$$N=N_D+N_{HDR}$$

where $N_D$ is the bit width of the pixel signals output from the analog-to-digital converter associated with sensor 501 and $N_{HDR}$ are the extra bits required to represent the dynamic range obtained after the digital gain is applied in the color channel gain module 502 and lens vignetting correction gain is applied in the lens vignetting correction module 503.

Typically, in an image processing pipeline, all processing occurs at the bit width of the ADC, e.g., $N_D$ bits. Accordingly, after gains are applied in modules 502, 503, the pixel signals are clipped to the bit width $N_D$. However, in accordance with the illustrated embodiment, the extended bit width N caused by the application of gain at one or both of the modules 502, 503, is retained at the output of module 503. This provides a wider dynamic range for the pixel signals. After the lens vignetting correction, the N-bit pixel signals are applied to a demosaicing module 504, which uses a line buffer memory 509 to demosaic the individual R, G, B pixel signals to provide image pixels, each of which has an R, G, B signal component. The demosaiced pixel signals are applied to an N-bit color correction module 505 that corrects or enhances the color of the image pixels. From there, the color corrected pixel signals are clipped to a bit width of $N_D$ (by module 507) for further image processing including gamma correction in module 508, not only the brightness, but also the ratios of red to green to blue.

Unclipped pixel signals having a bit width N, however, are supplied to the extended dynamic range (EDR) histogram module 506. The extended dynamic range histogram module 506 retains the N-bit pixel signal width of prior gaining steps. Module 506 thus provides a histogram of the pixel data having wider dynamic range due to the wider bit width N. The scene's high dynamic range limit is estimated, for example, by calculating pixel luminance values from the demosaiced R, G, B color components and analyzing a histogram of the pixel luminance values. Alternatively, a separate histogram for each color can be provided to assess distribution of pixel responses for each color. This method is particularly efficient in miniature mobile phone camera modules which suffer from strong lens vignetting effects. By not using clipped data, the dynamic range of the image in the histogram can be extended from 1 to 3 F-stops (6-18 dB).

The pixel data accumulated in the histogram in module 506 is examined to determine the high limit of the dynamic range of the scene as well as their distribution.

The first embodiment allows plotting a histogram of pixel data using demosaiced data. Histograms of pixel luminance only or for all three color channels may also be used to determine the high limit of a scene's dynamic range, as mentioned above.

In an alternative embodiment, the pixel data, after demosaicing in the demosaic module 504, may be clipped to its original bit width $N_D$ before entering the color correction module 505. In this case, the extended dynamic range histogram module 506 receives pixel data at the output of the demosaic module 505 based on demosaiced R, G, B color components, as shown by the dotted lines in FIG. 5.

Figure 6:
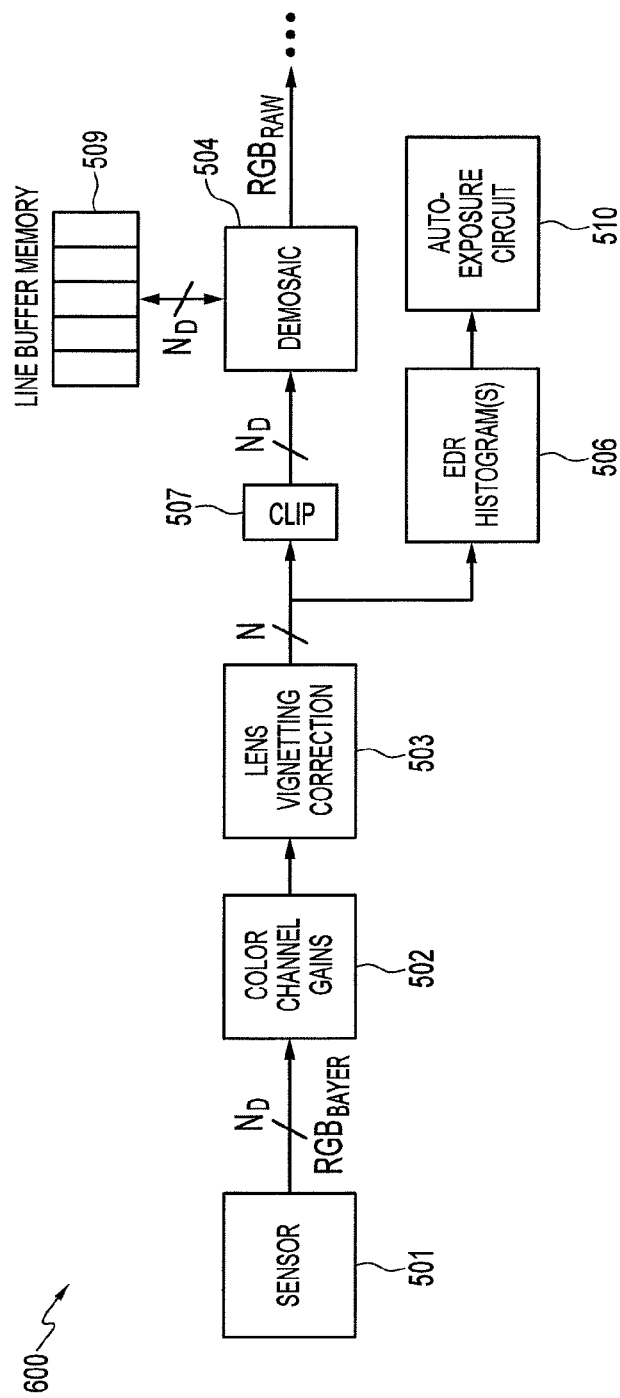
FIG. 6 is a block diagram of a second embodiment described herein.

In yet another embodiment illustrated in FIG. 6, bit width clipping to a bit width of $N_D$ (via module 507) can be implemented at the input to the demosaicing module 504 in which case the histogram module 506 receives an unclipped input of bit width N from the output of lens vignetting correction module 503.

In any of the embodiments described herein, the pixel data supplied to histogram module 506 may be plotted as a histogram in one of three ways: (i) all red, green, blue (RGB) components of a pixel data are merged into one histogram; (ii) an individual histogram is plotted for each of the red, green, blue (RGB) components and used to estimate scene dynamic range; or (iii) one color channel, e.g., green of pixel data is used for the histogram to estimate scene dynamic range. Besides analyzing individual R, G, B components, pixel luminance may be calculated from the demosaiced R, G, B values using equations well-known in the art, the pixel luminance plotted as a histogram and analyzed.

Using the color corrected data to determine the high limit of a scene's dynamic range, as illustrated in FIG. 5, is a good implementation because the histogram is plotted using color corrected data. However, pixel data processing modules, e.g., demosaic module 504 and color corrected module 505, which work with higher bit width are typically more expensive to implement than modules working with clipped lower bit widths, and therefore, using lower bit width processing modules while taking the histogram before the pixel data is clipped, as illustrated in FIG. 6, may be desired.

In any of the disclosed embodiments, the histogram is passed on to auto-exposure module 510 to estimate scene luminance distribution and maximum scene luminance by assuming a relation between the histogram pixel data and the scene luminance. Typically, for raw data it is assumed that the response of the green color channel approximates the luminance values of pixels before demosaicing and color correction and it is typically sufficient to use only the green color channel in processing the histograms.

The embodiments described and illustrated rely on hardware logic to implement the various pixel data processing modules; however, one or more of the modules may be implemented by software routines performing computational operations.

Figure 7:
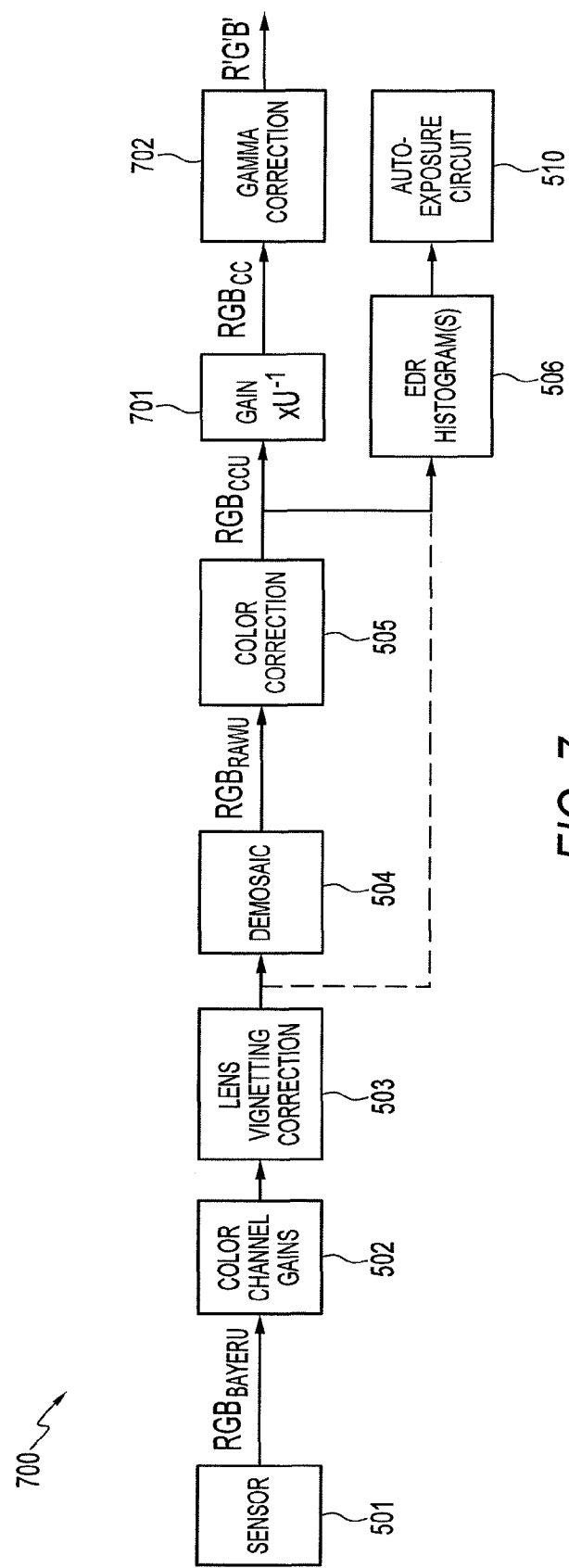
FIG. 7 is a block diagram of a third embodiment.

FIG. 7 shows another embodiment of an image processing pipeline 700, in accordance with another embodiment. In this embodiment, lens vignetting is not used to gain up a signal to provide a higher bit width. Instead, the exposure is lowered intentionally during a preview period prior to actual image capture to ensure that fewer or no bright pixels are "clipped" by the analog-to-digital converter in the image processing pipeline. Typically, a digital camera initially runs in a preview mode when the user desires to capture a scene. The preview mode usually is in progress until a user partially presses a shutter release button. When the user presses the shutter release button of the camera all the way, the camera transitions into a capture mode to capture the image. In such instances, the FIG. 7 embodiment may be particularly useful to determine the dynamic range of the image.

The camera's exposure module configures the sensor 501 to underexpose the image by a certain amount, for example, U. The underexposed pixel data are then supplied to a color channel gains module 502, the output of which is then corrected for lens vignetting in a lens vignetting correction module 503. The pixel data after lens vignetting correction is output to a demosaicing module 504. Subsequent to demosaicing, the pixel data are color corrected in module 505. The underexposed pixel data can be collected by a histogram module 506 and passed on to an auto-exposure module 510 for evaluation of maximum scene luminance and scene luminance distribution.

The color processing pipeline 700 is configured to cancel out the effects of underexposure by gaining back up the pixel data by, for example by a gain stage, $U^{-1}$. For example, the pixel data may be under-exposed by a factor of U=2, which corresponds to 1 F-stop.

An advantage of the FIG. 7 embodiment is that it could be used in a variety of cameras without substantial or costly hardware redesign needed to provide extended bit width processing. This method has a minor disadvantage—as it reduces signal-to-noise ratio (SNR) due to underexposure. However, the reduction in SNR occurs only during the preview mode and the SNR may be increased to a user-acceptable value by downsizing the preview image for display on a small-format screen.

In an alternative embodiment, the histogram module 506 may receive pixel data before demosaicing in the demosaic module 504, as shown by the dotted lines in FIG. 7. In this case, a gain $U^{-1}$ may be applied to the pixel data in the color correction module 505, which typically performs a matrix multiplication operation and applies additional gains to the pixel data. The hardware modifications to a camera for implementing the embodiment are lesser due to the elimination of the gain module 701.

The embodiments illustrated in FIGS. 5 and 6 may be used in combination with the embodiment illustrated in FIG. 7 to further increase the dynamic range of a camera.

Figure 8:
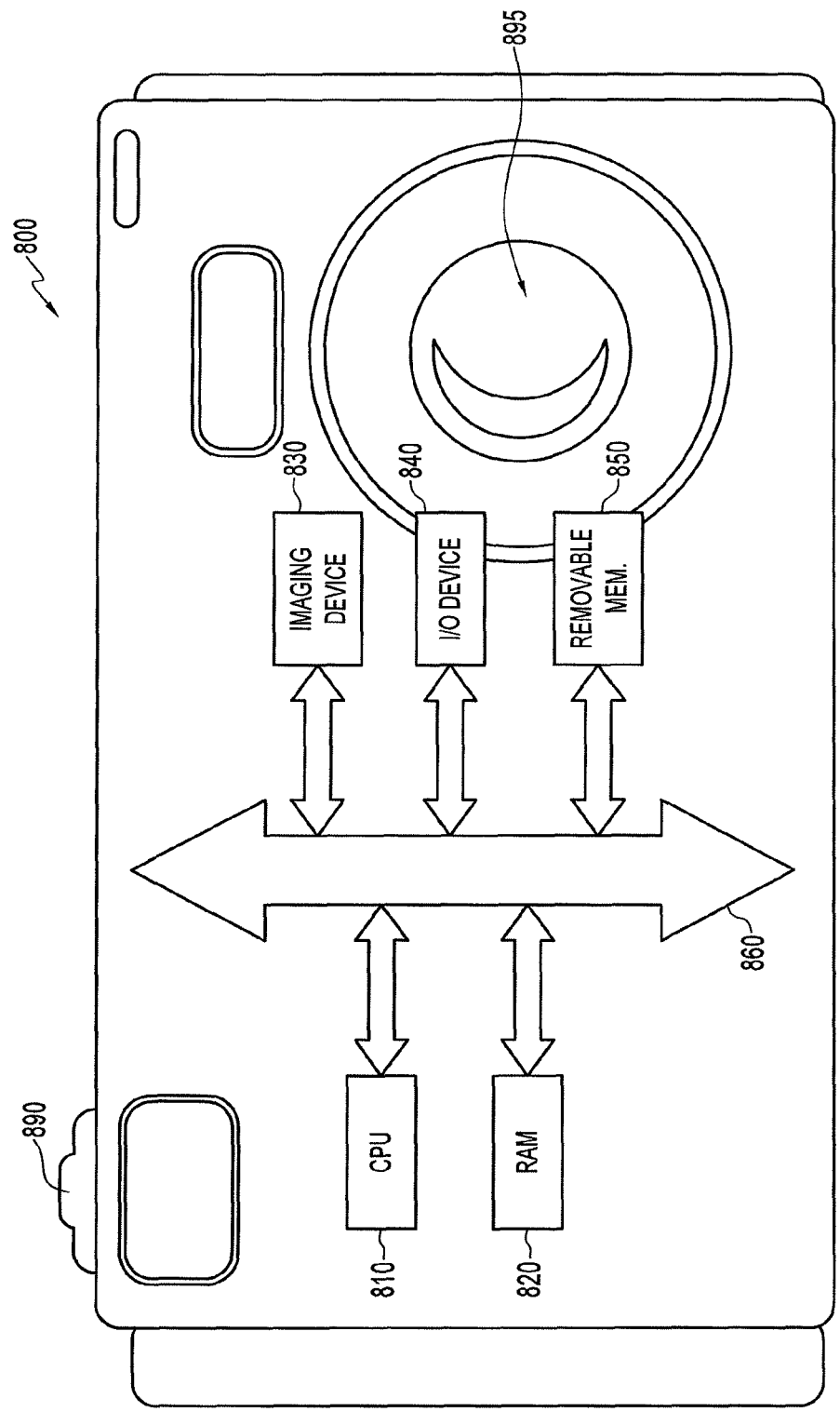
FIG. 8 is a block diagram illustrating a camera containing embodiments discussed herein.

FIG. 8 shows an image processor system 800, for example, a still or video digital camera system, which includes an imaging device 830, in accordance with an embodiment of the invention. The imaging device 830 may receive control or other data from system 800 and may provide image data to the system. System 800 includes a processor having a central processing unit (CPU) 810 that communicates with various devices over a bus 860. Some of the devices connected to the bus 860 provide communication into and out of the system 800; one or more input/output (I/O) devices 840 and imaging device 830 are such communication devices. Other devices connected to the bus 860 provide memory, illustratively including a random access memory (RAM) 820, and one or more peripheral memory devices such as a removable memory drive 850. A lens 895 is used to allow an image to be focused onto the imaging device 830 when e.g., a shutter release button 890 is depressed. The imaging device 830 may be coupled to the processor for image processing or other image handling operations. Non-limiting examples of processor systems, other than a camera system, which may employ the imaging device 830, include, without limitation, computer systems, camera systems, scanners, machine vision systems, vehicle navigation systems, video telephones, surveillance systems, auto focus systems, star tracker systems, motion detection systems, image stabilization systems, and others.

Embodiments described herein may also be practiced with matrix metering auto-exposure algorithms, wherein an image is subdivided into a grid of sub-windows and the scene luminance distribution is analyzed for each of the sub-windows.

While various embodiments of the invention have been described above, it should be understood that they have been presented by way of example, and not limitation. It will be apparent to persons skilled in the relevant art(s) that various changes in form and detail can be made.

What is claimed as new and desired to be protected by Letters Patent of the United States is:

1. An automatic exposure method comprising:
    underexposing an image of a scene by a predetermined amount during a preview mode which precedes an image capture mode for the scene;
    inputting underexposed image pixel data collected during the preview mode to an image processing pipeline;
    processing the underexposed image pixel data to obtain histogram information from the image pixel data;
    examining the histogram information to determine a high limit of a dynamic range for the scene; and
    adjusting an exposure parameter for the scene during an image capture mode based on the determined high limit.

2. The method of claim 1, wherein the histogram information is obtained after performing a color correction operation on the image pixel data.

3. The method of claim 1, wherein the histogram information is obtained before performing a demosaic operation on the image pixel data.

4. The method of claim 3, further comprising the step of applying a gain to the underexposed image pixel data.

5. The method of claim 2, further comprising the step of applying a gain to the underexposed image pixel data as part of the color correction operation.

6. An imaging device comprising:
    a sensor configured to underexpose an image of a scene by a predetermined amount during a preview mode which precedes an image capture mode for the scene;
    a pixel processing pipeline for processing underexposed image pixel data, the processing pipeline comprising a histogram module adapted to use the underexposed image pixel data to generate automatic exposure information; and
    an automatic exposure circuit for adjusting image exposure parameters based on the generated automatic exposure information.

7. The imaging device of claim 6, wherein the processing pipeline comprises a color correction module and the histogram module receives pixel data from the output of the color correction module.

8. The imaging device of claim 7, wherein the processing pipeline comprises a gain module for applying a gain to the underexposed image pixel data to cancel out the effects of the underexposure.

9. The imaging device of claim 6, wherein the processing pipeline comprises a demosaicing module and the histogram module receives pixel data at the input of the demosaicing module.

10. The imaging device of claim 9, wherein the processing pipeline comprises a color correction module, the color correction module applies a gain to the underexposed image pixel data to cancel out the effects of the underexposure.

11. A camera comprising:
    a lens; and
    an imaging device positioned to receive an image through the lens, the imaging device comprising:
    an image sensor adapted to output digitized pixel signals having a U bit-width, the digitized pixel signals are underexposed by a predetermined amount to provide un-clipped pixel data;
    an image processing unit for processing the underexposed and un-clipped pixel data corresponding to the digitized pixel signals using a histogram module to obtain automatic exposure information; and
    an auto-exposure circuit for adjusting an exposure value for the image sensor based on the histogram module automatic exposure information.

12. The camera of claim 11, wherein the image processing unit comprises a color correction module and the histogram module receives pixel data after color correction module.

13. The camera of claim 12, wherein the image processing unit comprises a first gain module for applying a gain to the underexposed image pixel data to cancel out the effects of the underexposure.

14. The camera of claim 11, wherein the image processing unit comprises a demosaicing module and the histogram module receives pixel data at the input of the demosaicing module.

15. The camera of claim 14, wherein the image processing unit comprises a color correction module, the color correction module applies a gain to the underexposed image pixel data to cancel out the effects of the underexposure.

16. The camera of claim 11, wherein the image processing unit comprises at least one second gain module for applying a gain to at least some of the digitized pixel signals, the at least one second gain module providing the un-clipped pixel data with a bit width of U+M, where M is an additional number of bits, and the histogram provides automatic exposure information having the U+M bit width.

17. The camera of claim 11, wherein the histogram module comprises at least three histograms, one for each color component in the image.

18. The camera of claim 11, wherein the histogram module uses combined color components in the image.

* * * * *